US008307297B2

(12) United States Patent
Gibson et al.

(10) Patent No.: US 8,307,297 B2
(45) Date of Patent: Nov. 6, 2012

(54) MODELING CONFIGURATIONS OF SYSTEMS

(75) Inventors: William E. Gibson, Woodinville, WA (US); Keith W. Short, Redmond, WA (US); Andrea R. Westerinen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1052 days.

(21) Appl. No.: 12/041,437

(22) Filed: Mar. 3, 2008

(65) Prior Publication Data

US 2009/0222751 A1 Sep. 3, 2009

(51) Int. Cl.
*G06F 3/048* (2006.01)
(52) U.S. Cl. .......................... 715/771; 715/772; 715/735
(58) Field of Classification Search .................. None
See application file for complete search history.

(56) References Cited

U.S. PATENT DOCUMENTS

| | | | |
|---|---|---|---|
| 6,167,564 A | 12/2000 | Fontana et al. | |
| 7,043,407 B2 | 5/2006 | Lynch et al. | |
| 7,234,132 B2 | 6/2007 | Lam | |
| 2003/0105838 A1* | 6/2003 | Presley | 709/220 |
| 2004/0031015 A1 | 2/2004 | Ben-Romdhane et al. | |
| 2004/0205179 A1 | 10/2004 | Hunt et al. | |
| 2004/0225952 A1 | 11/2004 | Brown et al. | |
| 2005/0216890 A1 | 9/2005 | Sundararajan et al. | |
| 2005/0251783 A1 | 11/2005 | Torone et al. | |
| 2005/0273758 A1* | 12/2005 | Long | 717/101 |
| 2006/0005162 A1 | 1/2006 | Tseng et al. | |
| 2006/0106585 A1 | 5/2006 | Brown et al. | |
| 2006/0111880 A1 | 5/2006 | Brown et al. | |
| 2006/0265231 A1* | 11/2006 | Fusaro et al. | 705/1 |
| 2006/0271341 A1 | 11/2006 | Brown et al. | |
| 2007/0124716 A1* | 5/2007 | Nation et al. | 716/18 |
| 2007/0198968 A1 | 8/2007 | Shenfield et al. | |

OTHER PUBLICATIONS

Microsoft Windows Server System, "System Definition Model Overview" Microsoft Corporation, Published Apr. 2004, 27 pages.
Weston, Richard, "Model-driven, component-based approach to reconfiguring manufacturing software systems", International Journal of Operations & Production Management, ISSN: 0144-3577, Year 1999, vol. 19, Issue: 8, p. 834-855.
John Stark Associates, "2PLM", Sep. 2005, vol. 8, No. 7, 9 pages.
Crnkovic, Ivica, "Component-based Software Engineering—New Challenges in Software Development", Information Technology Interfaces, 2003. ITI 2003. Proceedings of the 25th International Conference on Volume, Issue , Jun. 16-19, 2003, 14 pages.

* cited by examiner

*Primary Examiner* — Doon Chow
*Assistant Examiner* — Anil Kumar
(74) *Attorney, Agent, or Firm* — Workman Nydegger

(57) ABSTRACT

One embodiment may be practiced in a computing environment and includes method acts for creating a new component model from an existing component model. The method includes accessing an existing component definition. The existing component definition is included in an existing component schema, which includes definitions of configuration parameters defined for the existing component including defining that one or more parameters are further configurable. Definitions of the one or more parameters that are defined as being further configurable are refined. The refined definitions for the one or more parameter values are stored in a refined schema defining refinements of the component definition, without including the existing component schema. The refined schema is stored separately from the existing component schema.

11 Claims, 2 Drawing Sheets

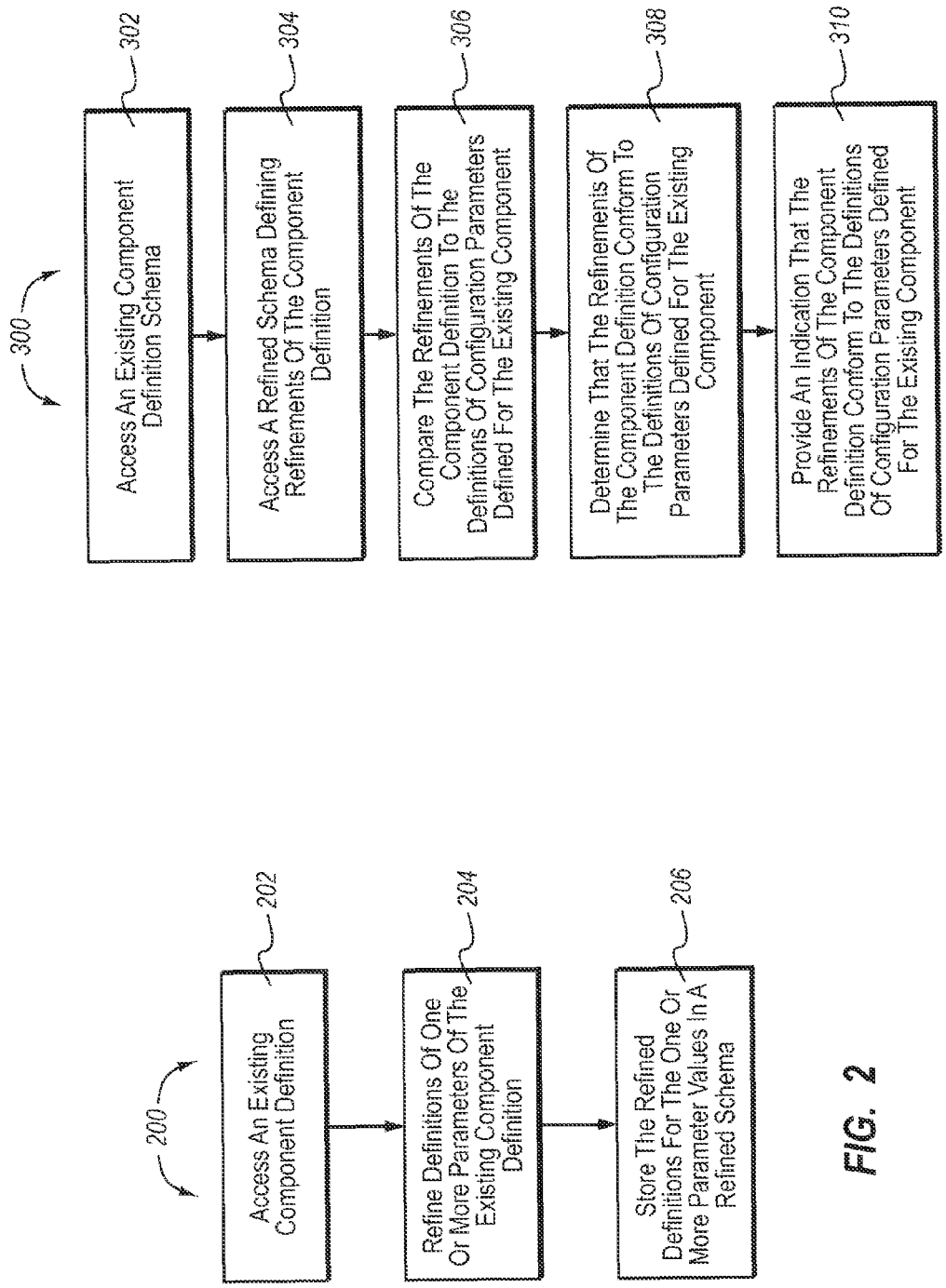

MODELING CONFIGURATIONS OF SYSTEMS

BACKGROUND

Background and Relevant Art

Computers and computing systems have affected nearly every aspect of modern living. Computers are generally involved in work, recreation, healthcare, transportation, entertainment, household management, etc.

System components are often simulated using models. This may be functional to abstract details, analyze performance and other capabilities such as security incompatibility, and to highlight relationships between components as they form aggregated structures, and between components as they transition through a software lifecycle. Typically, a software lifecycle includes three phases. Those phases are development, deployment and management. During the development phase the definition of components including descriptions of exposed functions are modeled. This allows models of the components to be configured and used in higher level components or systems.

During the deployment phase of the software lifecycle, a model may include a description of a configuration of a system or component for deployment and its resulting deployment. This may include explicit mapping of the system to other systems that provide infrastructural support to the system being deployed.

Modeling during the management phase of the software lifecycle includes a description of deployed instances of a system and its components, which may result from deployment or discovery of existing deployed systems. In this context the system models report maintenance, management and monitoring as well as design time reference and reuse. This context includes knowledge of the location of instances of deployed systems with respect to instances of their host systems.

The use of software models that describe the structure of systems across the life cycle of a system may prove challenging. For example, it may be desirable to change settings during the deployment phase from those set during the design phase. This may result in inconsistencies in models.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment may be practiced in a computing environment and includes method acts for creating a new component model from an existing component model. The method includes accessing an existing component definition. The existing component definition is included in an existing component schema, which includes definitions of configuration parameters defined for the existing component including defining that one or more parameters are further configurable. Definitions of the one or more parameters that are defined as being further configurable are refined. The refined definitions for the one or more parameter values are stored in a refined schema defining refinements of the component definition, without including the existing component schema. Refinements of a parameter may take the form, for example, of any combination of restricting the values permitted for that parameter, providing a specific value or values for that parameter or asserting whether the parameter value can be further changed in another schema that further refines the schema being defined. The refined schema is stored separately from the existing component schema.

Another embodiment practiced in a computing environment includes a method for determining that a new component derived from an existing component conforms to parameters set for the existing component. The method includes accessing an existing component definition. The existing component definition is included in an existing component schema, which includes definitions of configuration parameters defined for the existing component including defining that one or more parameters are further configurable. The method also includes accessing a refined schema defining refinements of the component definition, without including the existing component schema. The refined schema is stored separately from the existing component schema. The refinements of the component definition are compared to the definitions of configuration parameters defined for the existing component. It is determined that the refinements of the component definition conform to the definitions of configuration parameters defined for the existing component. An indication is provided that the refinements of the component definition conform to the definitions of configuration parameters defined for the existing component.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 2 illustrates a method of creating a new component from an existing component; and FIG. 3 illustrates a method of determining that a new component derived from an existing component conforms with parameters set for the existing component.

DETAILED DESCRIPTION

Figure 1:
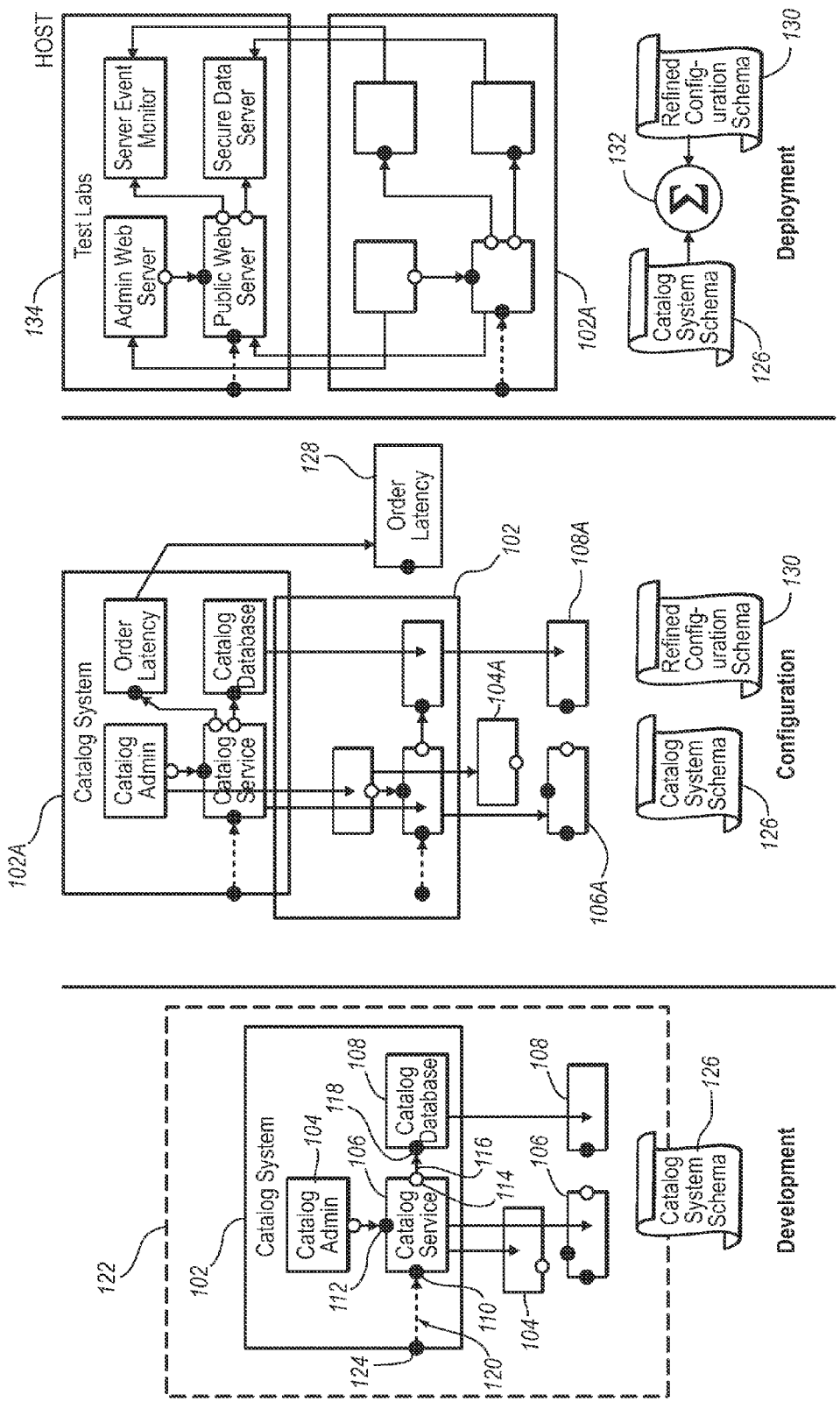
FIG. 1 illustrates embodiments implemented during development, deployment, and configuration stages of a software lifecycle.

Some embodiments described herein are directed to implementing modeling systems using component definitions stored in component schemas. The component definitions may include definitions of configuration parameters defined for a component. Additionally, the component definitions may define configuration parameters that may be further refined. Refinements to configuration parameters may be stored in a separate schema where the separate schema is stored separately from the original schema used to define configuration parameters for the component. Storing separately does not necessarily mean that the schemas are stored on different media, but rather that the schemas are stored as individual independent schemas. Notably, further refinements may be performed on refined schemas, where the further refinements are stored in yet another separate schema.

A host system model may also be implemented. The host system model has various configuration parameters, defining a modeled host's abilities to provide services and that a deployed component wants to consume. For example, to test a modeled system, the components comprising the modeled system may be deployed to the model host, which is configured to act as the host for the modeled system. In other words, embodiments may represent the separate concepts of composition, configuration and deployment hosting as relationships between the fundamental building blocks of systems. A system model is a composition of connected and configured components that is deployed to another system model suitably composed and configured to act as the first system models host.

Composition, configuration and hosting represent three dimensions across which one can query and process information about the nature of systems as they progress through the software life cycle. By ensuring these concepts are defined in one schema, system models that conform to this schema may be validated for correct structure during development, may be successively configured where appropriate during deployment, and may be deployed onto host systems for management in predictable ways.

Referring now to FIG. 1 an example of the functionality of one embodiment is illustrated. The example illustrated in FIG. 1 is illustrated in the context of an e-commerce enterprise. The e-commerce enterprise may include a catalog system model 102, which provides a catalog to users for selection of goods and services for purchase. Notably, while this example illustrates a catalog system model, it should be appreciated that in other embodiments other system models may be used. The catalog system model 102 may be a component of a larger system model such as an e-commerce store system model selling the goods and services represented by the catalog system model 102.

Additionally, the catalog system model 102 includes a composition of components as part of the catalog system model 102. For example, the catalog system model 102 includes a catalog administration 104, a catalog service 106 and a catalog database 108. Each of the components included in the catalog system model 102 maybe each their own system. Thus, a component can decompose into member components.

FIG. 1 further illustrates the concept of connections and connection points. For example, the catalog service component 106 includes three connection points. The first connection point 110 illustrates a connection point for the catalog service 106 to consume data or resources. As illustrated in FIG. 1, this connection point 110 receives data or resources from a source external to the catalog system model 102. The catalog service 106 includes a second connection point 112. The connection point 112 consumes data from the catalog administration component 104. The catalog service 106 further includes a third connection point 114. The third connection point 114 models the catalog service components ability to provide data or resources. In particular, connection points describe the sort of capabilities that a component offers or that they require to consume from a complementary component. In the model illustrated in FIG. 1 connection points may be connected by a connection. For example the connection 116 is illustrated as connecting the connection point 114 of the catalog service 106 to the connection point 118 of the catalog database 108.

Notably, the example in FIG. 1 further illustrates delegation. For example a delegation connection 120 is illustrated in FIG. 1. The delegation example illustrated in FIG. 1 illustrates that a system external to the catalog system model 102 is communicating with something inside the catalog system model 102. In this example the external system is communicating with the catalog service 106. The delegation typically occurs when a parent component delegates a connection point to a member component. For example, in the example illustrated in FIG. 1, catalog system model 102 may include the catalog service model 112. The catalog system model 102 can delegate through the delegation connection point 124 to the catalog service model 102.

In the development phase of the catalog system model 102, configuration parameters may be defined. In particular, configuration parameters may define capabilities of both components and connection points. The configuration parameters describe behaviors that should be configured. These behaviors are typically configured as part of the deployment. In the example illustrated in FIG. 1, the configuration parameters are defined in a catalog system schema 126.

The catalog system schema 126 may define the parameters in a number of different ways. For example, the catalog system schema 126 may indicate that certain parameters are further configurable at configuration time or deployment time. Conversely, the catalog system schema 126 may indicate that some parameters may not be changed from values defined by the developer at development time. Additionally, a developer may specify valid configuration parameter settings. For example, a developer may specify a range of values that may be used at configuration or deployment time. The values, ranges and limitations specified by a developer may be stored in the catalog systems schema 126 as illustrated in FIG. 1. FIG. 1 further illustrates the configuration time including a refined catalog system model 102A, which is a collapsed system of the configuration as will be discussed in more detail below. The refined catalog system model 102A includes refinements to configuration parameters defined for the catalog system model 102. In the example illustrated in FIG. 1, configuration parameters may be changed as illustrated by the catalog administration 104A, the catalog service 106A and the catalog database 108A. FIG. 1 further illustrates that the refined catalog system model 102A may include additional components such as the order latency component 128. The refinements made to the catalog system model 102 to create the refined catalog system model 102A including: the setting of configuration parameters for the order latency component 128, refined configuration settings for the catalog administration 104A, refined configuration settings for the catalog service 106A, and refined configuration settings for the catalog database 108A are stored in a separate schema shown as a refined configuration schema 130. The refined configurations schema 130 may be stored separately from the catalog system schema 126. Storing separately does not necessarily mean that the schemas 126 and 130 are stored on different media, but rather in each are stored as their own individual an independent schema.

FIG. 1 further illustrates a model of deployment time where the refined catalog system model 102A is deployed to a host system model 134 capable of hosting the system model 102A. To allow the catalog system model 102A to be installed on a host system model 134, configuration settings are collapsed into a single configuration. Collapsing the configuration settings includes following configured element and composition relationships to calculate final values for the configuration parameters.

In this very specific example, collapsing the configuration settings may also include performing a validation process to ensure that configuration settings made at configuration time do not conflict with configuration settings specified by a developer at development time. However, validation can be described more generally as applicable to this and other examples. In particular, a check is more generally that the value provided does not conflict with the definition of the parameter being defined, regardless of who defined it or in which refined schema the restriction was defined. This includes checking that a value was not provided for a parameter that has been marked as not modifiable. Validation is illustrative graphically in FIG. 1 by a comparator 132 which compares the catalog system schema 126 with a refined configuration schema 130. The comparator 132 may comprise programmatic code that is able to evaluate configuration settings specified by a developer in the catalog system schema 126 as compared to refinements made by a deployment administrator or a configuration administrator in the refined configuration 130. For example, a developer may specify a range of allowable configuration settings. If a configuration administrator defines the configuration outside of that range in the refined configuration 130, the comparator 132 will throw an exception to alert an installer that the refined configurations settings in the refined configuration 130 are incompatible with the configuration settings defined in the catalog system schema 126. For example, a configuration administrator attempts to change a value which a developer has said should not be changed. The comparator 132 can determine the attempt to change as compared to an indication that the value should not be changed, and therefore throw an exception. Alternatively, if the configuration settings specified in the refined configuration 130 are in compliance with the catalog system schema 126, an installer will be allowed to deploy the refined system model 102A to a host system model 134.

The totality of configuration and structural information about the application system model may be utilized by programs whose task is to validate that an application system model thus configured and structured has suitable host software at the host system model 134 actually available to execute the application model. Given that host system software may be modeled as a kind of application system using the same concepts, the validation process can be performed using a comparison between collapsed models of the application system model 102A and collapsed models of the host system model 136. To ensure traceability between host systems and the applications systems that they host, host relationships between model elements may be mapped. This is illustrated by the mapping of host model 134 components with application model 102A components in FIG. 1.

It should be noted that although the examples are given in terms of software systems, embodiments may be applied to the construction of modular hardware systems or systems containing a mix of hardware and software or any systems of other kinds that can be described in terms of configurable components. For example, embodiments may be applied to a computer network which is a system of inter-connected hardware and software elements. Embodiments may be applied to a PC motherboard, which is a system of inter-connected hardware elements.

Referring now to FIG. 2, a method 200 is illustrated. The method may be practiced for example, in a computing environment. The method includes acts for creating a new component model from an existing component model. The method includes accessing an existing component definition (act 202). The existing component definition is included in an existing component schema, which includes definitions of configuration parameters defined for the existing component. The existing component definition includes definitions that one or more parameters are further configurable. For example, FIG. 1 illustrates a catalog systems schema 126 which includes a component definition for the catalog system 102.

The method 200 further includes an act of refining definitions of the existing component definition (act 204). This may include refining definitions of the one or more parameters that are defined as being further configurable.

The method 200 further includes storing the refined definitions for the one or more parameter values in a refined schema (act 206). The refined definitions define refinements of the component definition. The refined schema does not include the existing component schema. Further, the refined schema is stored separately from the existing component schema.

Some embodiments of the method 200 may be practiced where the definitions of configuration parameters defined for the existing component include an indication of a range of acceptable parameter values for at least one of the one or more parameters that are defined as being further configurable. For example, a component designer may specify that further configuration is constrained within a range of values.

The method 200 may be practiced where refining definitions of the one or more parameters that are defined as being further configurable includes displaying a graphical user interface graphically including a graphical representation of the existing component. User input is received at the graphical user interface selecting the existing component. In response to the user input selecting the existing component, an indication is made that the one or more parameters are further configurable, and user interface elements are provided for receiving user input of parameter values for the one or more parameters. Additional user input is received at the user interface allowing the user to refine one or more parameter values.

Referring now to FIG. 3, another method 300 is illustrated. The method 300 may be practiced in a computing environment. The method 300 includes acts for determining that a new component model derived from an existing component model conforms to parameters set for the existing component model. The method includes accessing an existing component definition schema (act 302). The existing component schema which includes definitions of configuration parameters defined for the existing component including defining that one or more parameters are further configurable.

The method 300 further includes accessing a refined schema defining refinements of the component definition (act 304). The refined schema does not include the existing component schema. The refined schema is stored separately from the existing component schema.

The method 300 further includes comparing the refinements of the component definition to the definitions of configuration parameters defined for the existing component (act 306). For example, FIGURE one illustrates where an existing component schema 126 is compared to a refined configurations schema 130 using a comparator 132.

The method 300 further includes determining that the refinements of the component definition conform to the definitions of configuration parameters defined for the existing component (act 308).

The method 300 further includes providing an indication that the refinements of the component definition conform to the definitions of configuration parameters defined for the existing component (act 310).

Embodiments herein may comprise a special purpose or general-purpose computer including various computer hardware, as discussed in greater detail below.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of creating a new component definition from an existing component definition, for modeling changes to software during the lifecycle of the software, the method comprising:

creating, by a developer, a component schema representing software at a development phase, the component schema defining a plurality of components including connection points of each component, wherein a first component of the plurality of components includes configuration parameters for a connection point of the first component including defining that one or more of the configuration parameters are further configurable;

storing the component schema;

after the development phase and during a configuration phase, accessing, by a configuration administrator, the component schema to generate a modified component schema;

generating the modified component schema by modifying the one or more configuration parameters that are further configurable;

storing the modified component schema;

during a deployment phase of the software and prior to deploying the software from the modified component schema, comparing the modified component schema to the component schema to verify that the configuration parameters of the modified component schema as defined by the configuration administrator conform to the configuration parameters of the component schema as defined by the developer;

collapsing the component schema and the modified component schema into a collapsed application system model by following a configured element and composition relationship to calculate final values for configuration parameters;

mapping the collapsed application system model to a host system model, the host system model comprising modeled components, by mapping components of the application system model to components of the host system model; and determining that the final values of configuration parameters defined for components in the collapsed application system model conform to requirements of the components in the host system model to which it is mapped, and that the configuration of the host system model is suitable for execution of the application system as described by the application system model given the final values of configuration parameters on each component and the manner in which they are connected in the application system model; and providing an indication that the collapsed application system model conforms to requirements expressed in the host system model and that the host system model is suitable for execution of the collapsed system model given the final values of the configuration parameters of and connections between all the components therein.

2. The method of claim 1, wherein the definitions of configuration parameters for the connection point of the first component include an indication of a range of acceptable parameter values for at least one of the one or more parameters that are defined as being further configurable.

3. The method of claim 1, wherein modifying the one or more configuration parameters comprises:

displaying a graphical user interface graphically comprising a graphical representation of the first component;

receiving user input at the graphical user interface selecting the first component;

in response to the user input selecting the first component, indicating that the one or more parameters are further configurable, and providing user interface elements for receiving user input of parameter values for the one or more parameters; and receiving additional user input for modifying the one or more parameter values.

4. The method of claim 1, wherein the first component comprises one or more sub-component definitions of the first component.

5. The method of claim 1, wherein storing the modified component schema comprises storing additional sub-component definitions for the first component definition.

6. The method of claim 1, wherein the first component definition defines the first component as being incorporated in a higher level component.

7. In a computing environment, a computer storage device storing computer executable instructions which, when executed, perform a method of determining that a modified component schema derived from a component schema conforms to configuration parameters set for the component schema, the method comprising:
- creating, by a developer, a component schema representing software at a development phase, the component schema defining a plurality of components including connection points of each component, wherein a first component of the plurality of components includes configuration parameters for a connection point of the first component including defining that one or more of the configuration parameters are further configurable;
- storing the component schema;
- after the development phase and during a configuration phase, accessing, by a configuration administrator, the component schema to generate a modified component schema;
- generating the modified component schema by modifying the one or more configuration parameters that are further configurable;
- storing the modified component schema;
- during a deployment phase of the software and prior to deploying the software from the modified component schema, comparing the modified component schema to the component schema to verify that the configuration parameters of the modified component schema as defined by the configuration administrator conform to the configuration parameters of the component schema as defined by the developer;
- collapsing the component schema and the modified component schema into a collapsed application system model by following a configured element and composition relationship to calculate final values for configuration parameters;
- mapping the collapsed application system model to a host system model, the host system model comprising modeled components, by mapping components of the application system model to components of the host system model; and
- determining that the final values of configuration parameters defined for components in the collapsed application system model conform to requirements of the components in the host system model to which it is mapped, and that the configuration of the host system model is suitable for execution of the application system as described by the application system model given the final values of configuration parameters on each component and the manner in which they are connected in the application system model; and
- providing an indication that the collapsed application system model conforms to requirements expressed in the host system model and that the host system model is suitable for execution of the collapsed system model given the final values of the configuration parameters of and connections between all the components therein.

8. The computer storage device of claim 7, wherein the definition for the connection point of the first component defines a range of valid settings for one or more configuration parameters.

9. The computer storage device of claim 7, wherein the definition for the connection point of the first component defines that one or more configuration parameters may not be further modified.

10. The computer storage device of claim 7, wherein the first component comprises a plurality of sub-components of the first component.

11. A computer system, comprising:
- one or more processors;
- system memory; and
- one or more computer readable storage devices having stored thereon computer executable instructions that, when executed by the one or more processors, cause the computer system to perform a method, comprising:
  - accessing an existing component schema which defines a plurality of components including connection points of each component, the existing component schema defining software at a design phase;
  - accessing a definition of a first component within the existing component schema which includes definitions of configuration parameters for a connection point of the first component including defining that one or more of the configuration parameters are further configurable;
  - modifying the one or more configuration parameters that are further configurable;
  - creating a new component schema for storing the modified parameters, the new component schema defining the software at a deployment phase;
  - comparing the modified parameters to the definitions of the one or more configuration parameters that are defined as being further configurable in the existing component schema;
  - determining that the modifications to the one or more configuration parameters conform to the definitions of the one or more configuration parameters in the existing component schema;
  - providing an indication that the modifications conform;
  - collapsing the first component definition and the modified definitions into a collapsed application system model by following a configured element and composition relationship to calculate final values for configuration parameters;
  - mapping the collapsed application system model to a host system model, the host system model comprising modeled components, by mapping components of the application system model to components of the host system model;
  - determining that the final values of configuration parameters defined for components in the collapsed application system model conform to requirements of the components in the host system model to which it is mapped, and that the configuration of the host system model is suitable for execution of the application system as described by the application system model given the final values of configuration parameters on each component and the manner in which they are connected in the application system model; and
  - providing an indication that the collapsed application system model conforms to requirements expressed in the host system model and that the host system model is suitable for execution of the collapsed system model given the final values of the configuration parameters of and connections between all the components therein.

* * * * *